(No Model.)
W. T. NICHOLSON.
MACHINE FOR FORMING TEETH UPON FILE BLANKS.
No. 265,976. Patented Oct. 17, 1882.
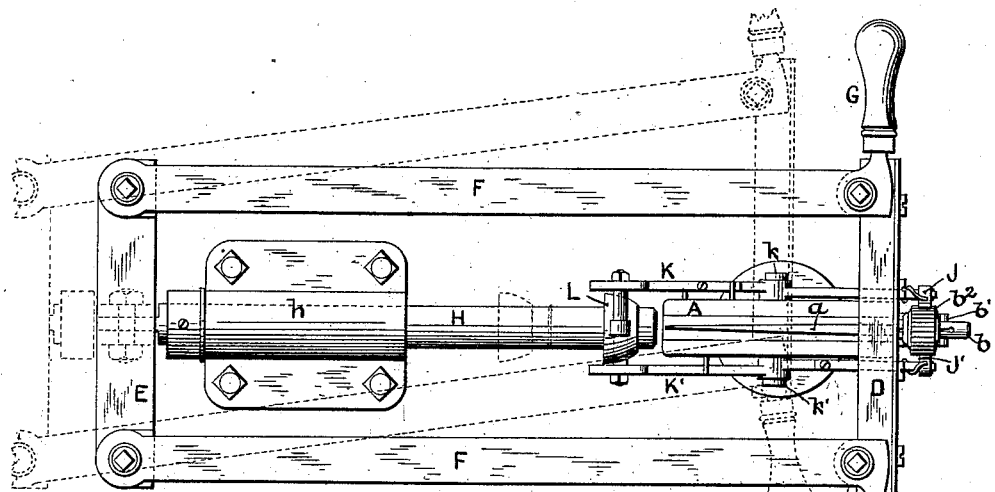
FIG. 1.
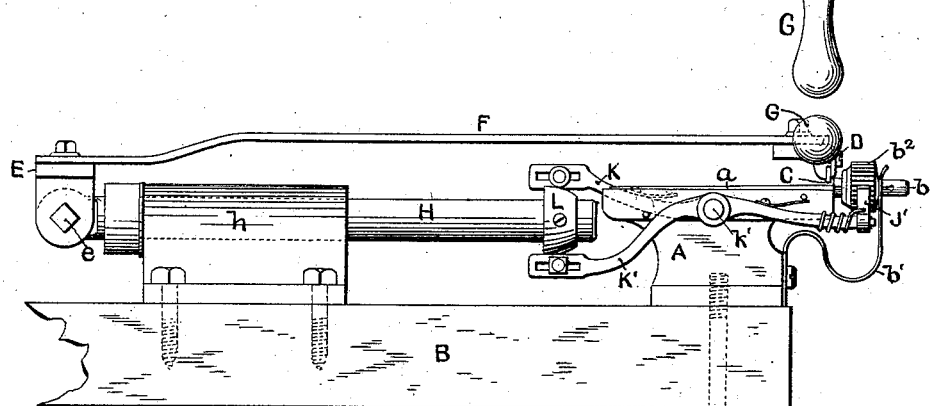
FIG. 2.
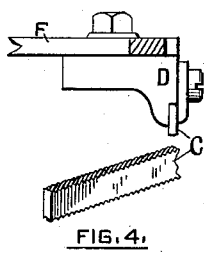
FIG. 4.
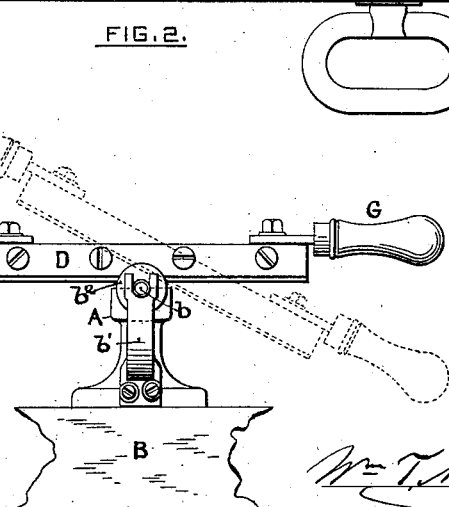
FIG. 3.
FIG. 5.
WITNESSES.
W. H. Thurston
L. Knight
INVENTOR.
Wm T. Nicholson

UNITED STATES PATENT OFFICE.

WILLIAM T. NICHOLSON, OF PROVIDENCE, RHODE ISLAND.

MACHINE FOR FORMING TEETH UPON FILE-BLANKS.

SPECIFICATION forming part of Letters Patent No. 265,976, dated October 17, 1882.

Application filed March 3, 1882. (No model.)

*To all whom it may concern:*

Be it known that I, WILLIAM T. NICHOLSON, of the city and county of Providence, and State of Rhode Island, have invented a new and useful Improvement in Machines for Forming Teeth upon File-Blanks; and I do hereby declare that the following specification, taken in connection with the accompanying drawings, forming a part of the same, is a full, clear, and exact description thereof.

This invention has reference particularly to machinery for assisting a workman in guiding a tool such, for example, as is exhibited at Figures 4 and 5 of the drawings, while such tool is rubbed, under pressure, over the surface of a file-blank, and held in a fixed relation between the axis of the tool and the axis of the file-blank during the successive rubbing operations necessary fully to form the teeth upon a blank.

In another application for Letters Patent filed by me I have described a new process for forming teeth upon file-blanks, which consists in causing a tool, grooved or threaded so as to have salient cutting-sections corresponding in number to the inch with the number of teeth to the inch with which the blank is to be provided, to be rubbed, under pressure, over the surface of the blank, while the axis of such tool is held relatively to the axis of the blank, so as to produce a series of teeth upon the blank of such inclination to its axis as may be desired. To execute such process by hand requires long experience and great skill on the part of the workman; and the present invention is designed to enable such process of forming teeth upon file-blanks to be performed by comparatively unskilled operators.

Referring to the drawings, Fig. 1 represents in plan a machine embodying my improvement. Fig. 2 shows a side elevation of the same. Fig. 3 represents an end view of the machine slightly modified. Figs. 4 and 5 show on an enlarged scale certain details of construction.

The blank to be cut is represented at $a$, Figs. 1 and 2, and in this case is supposed to be a small round file. It is secured by the tang to a holder, $b$, of suitable shape, and its body rests in a groove formed in the bed A, connected with the frame B of the machine.

The file-blank, when in position on its bed, is held against any material longitudinal movement in any preferred manner; but, as shown in Fig. 2 of the drawings, it is prevented from moving longitudinally in one direction by the engagement of the inner end of its holder $b$ with the bed A, and from moving in an opposite direction by a strong spring, $b'$, which forces the holder into contact with the bed.

Two varieties of tools or cutting-instruments, C, by which teeth can be formed upon the blank, are shown in enlarged views and in perspective at Figs. 4 and 5. The characteristic of these tools is that that portion of their surface which is to be rubbed over the surface of the file-blank under pressure applied to the tool, is formed with as many grooves to the inch in length as it is intended the file-blank to be cut by the tool shall have teeth to the inch, and the form of such groove corresponds with the intended form of the teeth, and the ridges between the grooves constitute the salient faces, which, in the movement of the tool when rubbed upon the surface of the blank, cut the spaces between the teeth on the file-blank. The tool C is secured to the under side of a tool-holder, D. This holder is connected with a cross-head, E, by means of two parallel links, F F, pivoted to the cross-head and to the holder, and the tool-holder is also furnished with a pair of handles, G G, to enable the workman to exert pressure upon the tool in rubbing it by successive movements over the file-blank from heel to point. The to-and-fro movements of the tool-holder in traversing the surface of the blank are confined in a longitudinal direction to the same path by means of the rod H, which slides within a keeper, $h$, or equivalent guides, and which rod is pivoted to the cross-head E, as shown at $e$, Fig. 2. It is obvious that the rod H, under the control of a fixed keeper or guide, $h$, will constantly cause a fixed relation between the axis of the cutting-tool and the axis of the file-blank to be maintained during the entire movement of the tool over the file-blank from heel to point.

In working the tool to perform the process of cutting a file-blank it is necessary that the tool be rubbed over the surface of the blank in a direction corresponding with the pitch of the salient faces and grooves upon the tool. Consequently in the illustration shown in the drawings at Fig. 1 the tool-holder D, cross-head E, and connecting parallel links F F will, during the movement of the tool over the blank from heel to point, change positions, as, sufficiently to be understood, is indicated by dotted lines.

In cutting a file-blank the workman, after the blank has been secured in its holder and is resting upon the bed, should adjust the right-hand end of the tool over the heel of the blank, and then, applying pressure upon the handles of the tool-holder, steadily exert force, so as to move the tool in a direction toward the tip of the blank. The pitch of the sharp salient faces of the tool will naturally cause the tool and its holder to take a movement oblique to the axis of the blank, under the conditions represented at Fig. 1, until the point of the blank is reached, when the tool, its holder, and the parallel connecting-links to the cross-head will stand in the position substantially as shown by dotted lines. It will be easy for the workman to perform every succeeding rubbing movement necessary to perfectly form the first row of teeth upon the blank, for the reason that the tool will necessarily, under the construction shown, be confined to a repetition of the same path of movement. The parallel links F F are preferably made of thin steel, so as to allow of the necessary movement of the tool under the pressure of the workman, and also, during the return movement, to allow the workman to raise the tool clear of the teeth under formation.

When round files are to be cut it is desirable that the blank should be rotated upon its axis, after any one row of teeth has been cut upon its surface, to enable the succeeding rows to be cut. A convenient means for accomplishing this result is exhibited at Figs. 1 and 2. The file-blank is inserted in the holder $b$, which has jaws for receiving the same, and is held by the constriction of said jaws through the collar $b^2$. The periphery of this collar is provided with ratchet-shaped teeth. With these teeth two spring-pawls, J J', are engaged, one of such pawls having a hook end adapted for pulling, and the other having a plain or pointed end adapted for pushing. These pawls are pivoted upon the ends of two levers, K K', located on opposite sides, respectively, of the bed A, and are capable of vibrating on fulcrum-pins $k$ $k'$.

Near the end of the guide-rod H is located a spheroidal or wedge-faced cam, L, and the relation of the ends of the levers K K' to such cam in one position of the parts is clearly shown in side view at Fig. 2. The end of each of the levers K K' is furnished with a friction-roller, one of which is shown in top view at Fig. 1. When the tool has been moved by the workman for a little distance toward the point of the file-blank the cam L will be moved away from contact with the friction-rollers attached to the levers K K', as shown by dotted lines at Fig. 1; but when the workman returns the tool to near the position for repeating the movement of the tool to cut a row of teeth the cam will become interposed, as shown at Fig. 2, between the friction-rollers, and cause the levers K K' to be moved like the blades of a pair of scissors, and consequently the two pawls J J' will be made to exert power in opposite directions to partially rotate the tool-holder and contained blank.

It is obvious that the collar $b^2$ may be a fixture upon the tool-holder and the constriction of the holding-jaws be effected by other means—as, for example, a simple sliding sleeve may be used instead of the arrangement shown at Fig. 2, in which the collar performs the double office of a ratchet-wheel to assist in intermittingly revolving the file-blank holder, and also the office of a constricting-collar to enable the holding-jaws to be pinched upon the blank.

In putting teeth upon the backs of "half-round" blanks the apparatus may be modified so that the tool for cutting the teeth on the convex surface of such blanks may occupy different planes of inclination to a horizontal plane, the file-blank remaining stationary on its bed. An illustration of this modification is exhibited at Fig. 3, the machine being the same as that illustrated at Figs. 1 and 2, with the exception that the devices for intermittingly rotating the blank are removed.

While I prefer to use, on account of its simplicity, and have described, a holder for the file-cutting tool the longitudinal axis of which is held and maintained during the movement of the tool over the surface of the file-blank at a fixed angle with the longitudinal axis of such blank by means of parallel rods or links jointed at their extremities to the holder, and to a guided cross-head bar parallel therewith, it is obvious that there may be substituted other mechanical means, different in form but equivalent in principle, for so confining the movement of the holder and the cutting-tool to a prescribed path and be within the scope of my invention — as, for example, two guiding-grooves may be cut in the bed or support for the file-blank parallel with each other and at any preferred angle with the longitudinal axis of the file-blank, and the tool-holder may be furnished upon its under side with two tongues or feathers parallel with each other and fitting such grooves, and arranged at any preferred angle with the longitudinal axis of the holder. So, also, in place of such guiding-grooves, fixed parallel rods or rails raised above the surface of the file-bed may be employed, and suitable grooves in or holes through the holder may be arranged for mounting the holder upon such rails or rods, so that it can travel on the same and be confined to a prescribed path; and, again, a single fixed guide-rod may be used, located above and parallel with the surface of the file-bed and in a plane intersecting the axis of the blank, and the holder may be furnished with a sleeve fixed upon its upper surface and fitted to slide on such guide-rod. These obvious modifications will accomplish the same result as the guided parallel-motion frame illustrated in the drawings.

What I claim as my invention, and desire to secure by Letters Patent, is—

1. The combination, substantially as before set forth, of a bed for supporting a file-blank to be cut, a file-cutting tool such as specified, cutting by a rubbing motion, and means, substantially as described, for preserving a fixed relation between the longitudinal axes of the tool and file-blank bed when the tool is rubbed over the surface of the blank to form teeth thereon.

2. The combination, substantially as before set forth, of the bed for supporting a file-blank to be cut, a file-cutting tool, as described, and a sliding parallel-motion frame controlled by a guide for preserving a fixed relation during the movements of the cutting-tool over the surface of the file-blank between the longitudinal axis of such tool and the longitudinal axis of the file-blank.

3. The combination, substantially as before set forth, of a holder for the file-blank capable of rotating axially, a ratchet-wheel attached thereto, levers and pawls for operating the same, a bed for supporting the file-blank, a sliding parallel-motion frame carrying the tool for cutting the teeth on the blank and controlled by a guide in its path of movement, and mechanism, substantially as described, for causing the blank-holder to be intermittingly rotated by the movement of the sliding frame.

WILLIAM T. NICHOLSON.

Witnesses:
  W. H. THURSTON,
  I. KNIGHT.